Aug. 21, 1956   D. R. BISHOP ET AL   2,759,404
PHOTOGRAPHIC APPARATUS

Filed Aug. 8, 1952   7 Sheets-Sheet 1

FIG. 1

INVENTORS
Donald R. Bishop
Murry N. Fairbank
William J. McCune, Jr.
Norton T. Pierce
BY Brown and Mikulka
and
Gerald Altman
ATTORNEYS Aug. 21, 1956　　　D. R. BISHOP ET AL　　　2,759,404
PHOTOGRAPHIC APPARATUS Filed Aug. 8, 1952　　　　　　　　　　　　　7 Sheets-Sheet 4

INVENTORS
Donald R. Bishop
Merry N. Fairbank
William J. McCune, Jr.
and
Norton T. Pierce
BY Brown and Mikulka
and
Gerald Altman

ATTORNEYS

Aug. 21, 1956     D. R. BISHOP ET AL     2,759,404
PHOTOGRAPHIC APPARATUS Filed Aug. 8, 1952     7 Sheets-Sheet 6

INVENTORS
Donald R. Bishop
Murry N. Fairbank
William J. McCune, Jr.
and
Norton T. Pierce
BY Brown and Mikulka
and
Gerald Altman
ATTORNEYS

FIG. 13

United States Patent Office 2,759,404
Patented Aug. 21, 1956

2,759,404

PHOTOGRAPHIC APPARATUS

Donald R. Bishop, Westwood, Murry N. Fairbank, Belmont, William J. McCune, Jr., South Lincoln, and Norton T. Pierce, Reading, Mass., assignors to Polaroid Corporation, Cambridge, Mass., a corporation of Delaware Application August 8, 1952, Serial No. 303,244

15 Claims. (Cl. 95—13)

This invention relates to photography and more particularly to photographic apparatus wherein an exposed photosensitive sheet is processed.

An object of the present invention is to provide a photographic apparatus for processing exposed frames of a photosensitive sheet by superposing the frames on areas of another sheet and spreading a layer of processing composition between the frames and the areas to form sandwiches, there being provided means for storing a plurality of the sandwiches for substantially a predetermined processing time.

Other objects are: to provide photographic apparatus of the type wherein a photosensitive sheet is processed, said apparatus comprising means for spreading processing composition on successive portions of said sheet, means for severing said successive portions from the remaining portions of said sheet, and means for stacking a plurality of said successive portions; to provide photographic apparatus for processing exposed frames of a photosensitive sheet, the apparatus comprising a pair of pressure-applying members for superposing the frames on areas of another sheet and spreading a layer of processing composition between the frames and areas to form sandwiches, a cutting means for severing the sandwiches from the remainder of the sheets, and means for stacking a plurality of the sandwiches; to provide apparatus of the above type comprising guide means defining a predetermined surface for positioning frames for exposure; to provide pressure-applying members of the above type comprising a pair of rollers the axes of rotation of which lie in a plane that intersects the aforementioned predetermined surface at an angle of other than ninety degrees; to provide a pair of pressure-applying members resiliently urged toward each other for exerting pressure on sheet material positioned therebetween, at least one of the pressure-applying members being a rotatable roller which includes end portions and an intermediate portion between the end portions, the intermediate portion having a relatively smooth cylindrical surface, a first friction-generating means encircling one of the end portions, and a second friction-generating means encircling the other of the end portions; to provide an apparatus of the above type wherein the means for stacking a plurality of sandwiches includes a platform which lies in a plane intersecting the aforementioned predetermined surface, wherein a supply of photosensitive sheet is positioned adjacent one of the opposite ends of the platform on one of the opposite sides thereof and wherein a supply of other sheet is positioned adjacent the other of the opposite ends of the platform on the other of the opposite sides thereof; to provide apparatus of the above type comprising drive means for advancing a frame and an area of the sheets between a pair of rollers to form a sandwich and thereafter for operating a cutting means in order to sever the sandwich from the remainder of said sheets; and to provide an apparatus of the above type which may be readily loaded with a photosensitive sheet and another sheet and that is simple in construction and operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Photographic apparatus of the type herein illustrated generally includes means for processing an exposed photosensitive sheet by superposing it on another sheet and by spreading a thin layer of processing composition between the sheets. By way of example, the photosensitive sheet includes a silver halide layer, the other sheet includes a silver precipitating layer, and the processing composition includes a developer, a silver halide solvent and an alkali. The layer of processing composition between the frame and the area is formed by advancing the sheets between a pair of pressure-applying members. In the presence of this layer of processing composition, a latent image in the photosensitive sheet is developed to silver and a soluble silver complex from unexposed silver halide is formed, is transferred by imbibition to the other sheet, and there is developed to silver to produce a positive image.

The photographic process and various species and alternative forms of photosensitive and other sheets herein referred to are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use wtih any particular species of photosensitive or other sheets, the terms "photosensitive sheet" and "other sheet" being used in their broadest sense to indicate a first sheet which is photosensitive and a second sheet which merely may aid in spreading the processing composition over the surface of the photosensitive sheet or which may, if desired, possess other characteristics.

Generally, the embodiment of the herein disclosed invention illustrated in the accompanying drawings is a magazine which may be removably attached to an aerial camera of conventional design. The magazine, when so attached, is adapted to position successive frames of a photosensitive sheet in the focal plane of the lens of the camera and to transmit actinic light from the lens to successive frames so positioned. A pair of pressure-applying rollers are provided between which the photosensitive sheet and another sheet are adapted to advance in superposed relation whereby given frames of the photosensitive sheet become registered with given areas of the other sheet. The other sheet has on one of its surfaces a succession of processing composition containers, one container being associated with one area. During advancement of portions of the sheets between the rollers, a container is caused to eject its processing composition, which thereafter is spread between a frame and an area to form a sandwich. The sandwich advances into a processing chamber. Cutting means are provided for severing a succession of such sandwiches from the photosensitive and other sheets. Means are provided for stacking successive sandwiches in the processing chamber. A plurality of sandwiches are allowed to remain in the processing chamber for substantially a predetermined time during which the latent images in their frames are processed and positive prints are formed in their areas. The processing composition is so chosen as to properly perform its processing function although maintained between a frame and an area for a period the precise duration of which is not critical. Thus, a plurality of sandwiches, formed at different times, may be removed from the processing chamber at once.

Referring now to the drawings, wherein like numerals denote like parts, there is shown a magazine embodying the present invention. The illustrated magazine is usable in conjunction with an aerial camera of conventional design, the forward portion of which is provided with a suitable lens and shutter mechanism (not shown) and the rearward portion of which has secured thereto a frame, generally shown at 20 (Fig. 1), for detachably mounting the hereinafter described magazine at the rear of the camera. Frame 20 defines an exposure aperture 22 and a guide surface 24 coincident with the focal surface of the aforementioned lens, surface 24 being adapted to position a photosensitive sheet for exposure to actinic radiation transmitted from the lens through aperture 22.

Figure 1:
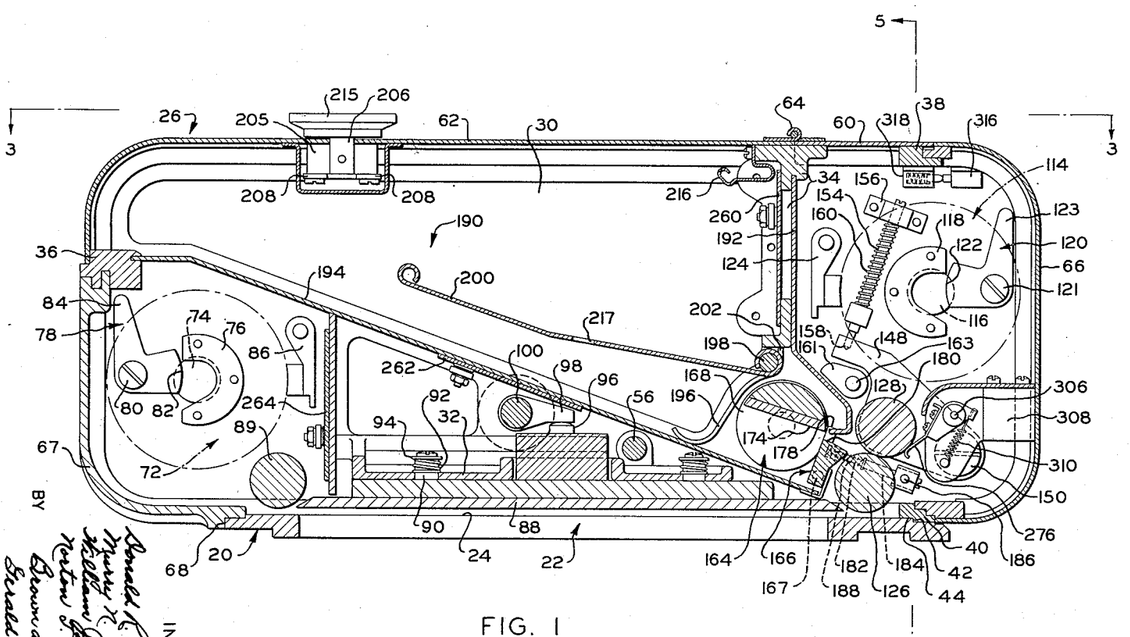
Figure 1 is a diagrammatic, sectional view of a magazine embodying the herein disclosed invention, the section being taken along a line midway between the sides of the camera.
Figure 5:
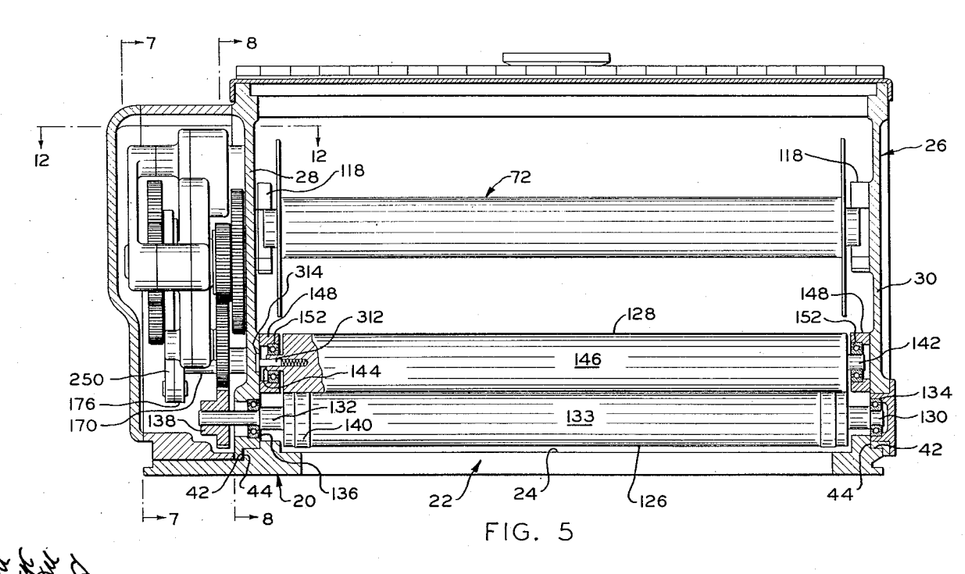
Fig. 5 is a sectional view taken substantially along the line 5—5 of Fig. 1.

As a means for supporting and partially enclosing the various components of the magazine, a housing, generally designated at 26, is provided. In the form shown, housing 26 includes a pair of side walls 28 and 30 (Fig. 5). Side walls 28 and 30, viewing Fig. 1, are spaced from and rigidly connected to each other by a reticulated, horizontal tie plate 32, a reticulated, vertical tie plate 34, a crosspiece 36 at the left end of the magazine and upper and lower crosspieces 38 and 40 at the right end of the magazine.

For operatively seating housing 26 on frame 20 (Figs. 1 and 5), walls 28 and 30 are provided with shouldered edge portions 42 and frame 20 is provided with shouldered portions 44, portions 42 and 44 being adapted to engage each other in lighttight fashion.

Figure 4:
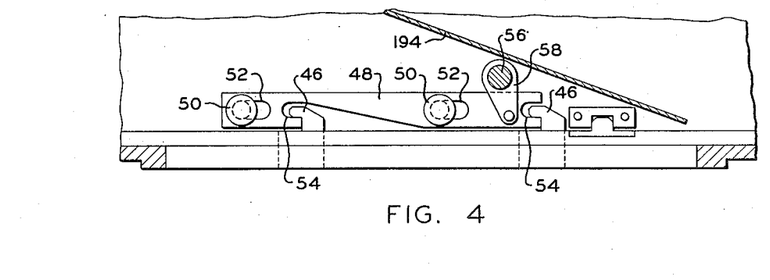
Fig. 4 is a fragmentary, sectional view taken substantially along the line 4—4 of Fig. 3.

In Fig. 4 there is illustrated a suitable means for securing housing 26 to frame 20. Affixed to opposite edges of frame 20 are a pair of hook-shaped elements 46. A pair of plates 48 are slidably mounted on side walls 28 and 30 by such means as pins 50 and slots 52, each plate having a pair of hook portions 54 which are adapted to engage hook-shaped elements 46 in order to secure shouldered edge portions 42 in seated position on shouldered portions 44. Hook portions 54, when shouldered edge portions 42 are seated on shouldered portions 44, may be moved into and out of engagement with hook-shaped elements 46 by such means as a crank shaft 56 (Figs. 1 and 4), the ends of which are journaled in side walls 28 and 30. Crank shaft 56, as shown, is operatively connected to each plate 48 by a link 58, one end of which is affixed to shaft 56 and the other end of which is pivoted to one of plates 48. A suitable crank handle (not shown) is affixed to an end of shaft 56, externally of housing 26, for rotating crank shaft 56 and thereby moving hook portion 54 into and out of engagement with hook-shaped elements 46.

Ordinarily, the magazine is rendered lighttight by side walls 28 and 30, a top wall 60, a closure 62 pivoted as at 64 to vertical tie plate 34 and adapted to snugly engage crosspiece 36, a removable cover member 66 adapted to snugly engage crosspieces 38 and 40, and a stationary cover member 67 affixed to frame 20 at 68 and adapted to snugly engage crosspiece 36 when housing 26 is operatively mounted on frame 20.

Figure 2:
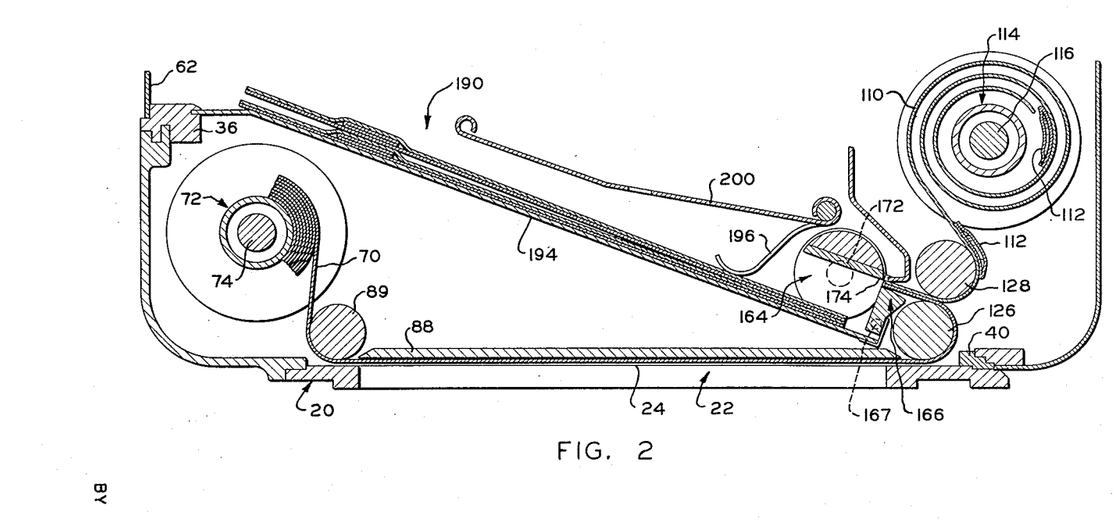
Fig. 2 shows the magazine of Fig. 1 with a photosensitive sheet and another sheet operatively positioned therein.

One example of a supply of photosensitive sheet which is adapted to be exposed and processed within the illustrated camera is shown in Fig. 2 mounted within housing 26. The photosensitive sheet, herein designated at 70, preferably comprises a suitable base and a suitable photosensitive layer on one side of the base. The photosensitive layer, for example, may be composed of a silver halide emulsion and is provided with a succession of frames which are adapted to receive a succession of latent images upon photoexposure. The supply of sheet 70 is carried by a spool 72 of conventional design and having a spindle around which sheet 70 is coiled, a pair of disks for aligning the successive convolutions of sheet 70, and a shaft 74 extending through the spindle.

As a means for mounting spool 72, there are provided on side walls 28 and 30 a pair of aligned bosses 76 which are adapted to seat the opposite ends of shafts 74. Such means as bell crank levers 78 (Fig. 1), pivoted to side walls 28 and 30 as at 80, are provided in order to positively urge the ends of shaft 74 against bosses 76. End portions 82 of levers 78 are urged, by means of a suitable spring (not shown), into engagement with the ends of shaft 74 and end portions 84 may be manually engaged in order to dissociate the ends of shaft 74 from bosses 76. Such means as pivoted drag brushes 86 are spring biased (springs not shown) against the disks of spool 72 in order to prevent them from rotating excessively. When housing 26 is unmounted on frame 20, spool 72 may be readily inserted into and removed from it.

As a means for clamping a frame of sheet 70 to guide surface 24 for exposure to radiation transmitted through aperture 22, there is provided a pressure plate 88 which, viewed in Fig. 1, is movable vertically with respect to guide surface 24. Pressure plate 88, when in its lowermost position, may be said to be actuated. Pressure plate 88, when in its uppermost position, permits advancement of portions of photosensitive sheet 70 past an idler roller 89 and along guide surface 24. When in its uppermost position, pressure plate 88 may be said to be deactuated.

The motion of pressure plate 88 with respect to guide surface 24, in the illustrated embodiment, is controlled (Fig. 1) by four pins 90 which adjoin the four corners of the pressure plate and by four openings in tie plate 32 which slidably receive the four pins. Around each pin 90 is coiled a helical spring 92, one end of which abuts against tie plate 32 and the other end of which abuts against such means as a washer 94 affixed to the free end of pin 90. It is apparent that springs 92 normally urge pressure plate 88 into its uppermost position. The means for urging pressure plate 88 into its lowermost position comprises a pair of pins 96 adjoining opposite edges of pressure plate 88. A pair of arms 98, which are adapted to abut against pins 96 and thereby to actuate pressure plate 88, are keyed to a shaft 100, the ends of which are journaled in side walls 28 and 30. Affixed to shaft 100 is a crank arm 102 (Figs. 1 and 7) which is operatively connected to the remainder of the herein disclosed mechanism in a manner later to be described.

Pressure plate 88 is provided with a plurality of apertures (not shown) within which a partial vacuum may be created in order to draw the central section of a frame of sheet 70 into intimate contact with the sheet-contacting face of the pressure plate. A suitable control valve 104, adapted to be operatively connected as at 106 to a vacuum pump, may be operatively connected to the apertures in pressure plate 88 in any suitable manner. An arm 108 (Fig. 7), which is keyed or otherwise secured to shaft 100, is adapted to operatively connect the apertures to the vacuum pump when pressure plate 88 is actuated and to disconnect the apertures from the vacuum pump when the pressure plate is deactuated.

A supply of another sheet, in conjunction with which photosensitive sheet 70 may be processed, is shown in Fig. 2 mounted within housing 26. This other sheet, herein designated at 110, preferably comprises a base and a suitable image-receiving layer on one side of the base. The image-receiving layer, for example, may comprise one of the compositions, now well known in the art, which adapt it to receive, in successive image-receiving areas thereof, positive prints of the latent images in frames of photosensitive sheet 70. A succession of containers, designated generally at 112 in the illustrated embodiment, are provided for carrying a liquid processing composition. As shown, containers 112 are affixed to the image-receiving layer of sheet 110 at substantially regularly spaced intervals from a location adjacent its leading end toward its trailing end, the containers being so spaced that one container is associated with one image-receiving area. Each container is provided with a rupturable mouth, facing the trailing end of sheet 110, this mouth being adapted to eject processing composition when opposed compressional forces are applied to the container. The supply of sheet 110 is carried by a spool 114 of conventional design and having a spindle around which sheet 110 is coiled, a pair of disks for aligning the successive convolutions of the sheet, and a shaft 116 extending through the spindle.

As a means for mounting spool 114, there are provided on side walls 28 and 30 a pair of aligned bosses 118 which are adapted to seat the opposite ends of shaft 116. Such means as bell crank levers 120, pivoted to side walls 28 and 30, as at 121, are provided in order to positively urge the ends of shaft 116 against bosses 118. End portions 122 of levers 120 are urged by means of suitable springs (not shown) into engagement with the ends of shaft 116 and end portions 123 may be manually engaged in order to dissociate the opposite ends of shaft 116 from bosses 118. Such means as pivoted drag brushes 124 are spring biased (springs not shown) against the disks of spool 114 in order to prevent them from rotating excessively. When housing 26 is unmounted on frame 20, spool 114 may be readily inserted into and removed from it.

Pressure-applying means are provided for processing latent images in frames of sheet 70. In the form shown (Fig. 5), the pressure-applying means comprise a pair of rollers 126 and 128 between which sheets 70 and 110 may be superposed. Means, later to be described in detail, are provided for causing rotation of the rollers and thereby for advancing the sheets between them. Advancement of a frame of sheet 70 and an associated image-receiving area of sheet 110 between the rollers causes ejection of processing composition from the mouth of a container 112 and spreading of the processing composition between the frame and the area to form a sandwich. Within the sandwich the latent image in the frame is processed and a positive print is formed in the image-receiving area.

In the form shown, roller 126 is provided with a pair of stub shafts 130 and 132 integrally affixed to its opposite ends and a polished, cylindrical, pressure-applying surface 133. The free ends of shafts 130 and 132 are of reduced diameter, the free end of shaft 130 extending into a bearing 134 that is mounted in side wall 30 and the free end of shaft 132 extending through a bearing 136 which is mounted in side wall 28. As a means for causing rotation of roller 126, a drive gear 138 is keyed or otherwise secured to the free end of shaft 132, gear 138 being operatively connected to the remainder of the herein disclosed mechanism in a manner later to be described. In order to prevent slippage between roller 126 and those portions of sheet 70 in contact with it, a pair of friction-generating strips 140 encircling the roller's opposite end portions are provided. Strips 140 preferably are composed of rubber, but may, for example, be composed of an organic plastic or a gritty material. Alternatively, in place of discrete strips, the opposite end portions of roller 126 may be rough ground or otherwise roughened to provide desirable friction-generating characteristics.

In the form shown, roller 128 is provided with a pair of stub shafts 142 and 144, integrally affixed to its opposite ends, and a polished, cylindrical, pressure-applying surface 146. For mounting roller 128 (Fig. 1), there are provided a pair of supports 148 which are pivoted to side walls 28 and 30, as at 150, and which carry a pair of bearings 152 that rotatably receive the free ends of stub shafts 142 and 144. A means is provided for normally biasing roller 128 toward roller 126. In the form shown, this means includes a pair of rods 154, one end of each rod being slidable in a bushing 156 affixed to one of side walls 28 and 30, and the other end of each rod being adapted to project into a bore 158 in support 148. Each rod 154 is resiliently urged into one of bores 158 by such means as a helical spring 160, one end of which abuts against one of bushings 156 and the other end of which abuts against a shoulder 162 integral with the rod. The diameter of bore 158 is greater than the diameter of the end of rod 154 projecting into it so as to permit simultaneous pivotal movement of support 148 and sliding movement of rod 154. A means is provided for spacing rollers 126 and 128 apart so that sheets 70 and 110 may be threaded between the rollers when the magazine is being loaded. In the form shown, this means (Fig. 1) comprises a pair of cams 161 aligned with supports 148 and mounted on a common shaft 163. The opposite ends of shaft 163 are journaled in side walls 28 and 30, one of these ends being provided with a manually engageable handle (not shown) by means of which the shaft may be rotated. This construction is such that cams 161 are capable of engaging supports 148 in order to pivot roller 128 away from roller 126.

Figure 6:
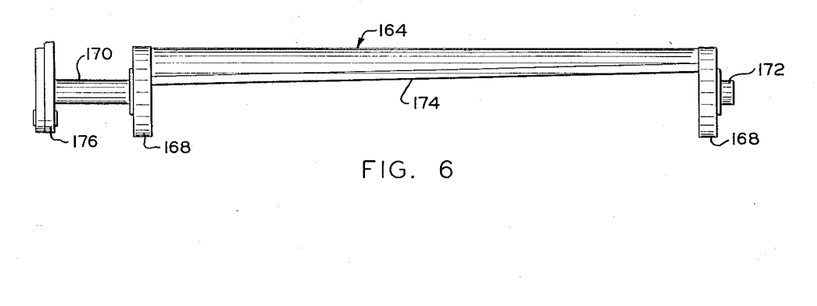
Fig. 6 is a detail view of a cutting element embodied in the magazine of Fig. 1.

In accordance with the present invention, a cutting means is provided for successively severing sandwiches formed by frames of sheet 70 and areas of sheet 110 from the remainder of the sheets. As shown (Figs. 1, 2 and 6), the cutting means comprises a blade 164 and an anvil 166. Blade 164, as illustrated, includes a pair of disklike elements 168 at its opposite ends, a pair of stub shafts 170 and 172 extending from its opposite ends, and a cutting edge 174 positioned between the disklike elements. Shaft 172 is journaled in side wall 30 and shaft 170 is journaled in and extends through side wall 28. As a means for causing pivotal movement of blade 164, a crank arm 176 is keyed or otherwise secured to the free end of shaft 170, this arm being operatively connected to the remainder of the herein disclosed mechanism in a manner later to be described.

Anvil 166 (Fig. 1), as illustrated, is trunnioned on stub shafts 167 which extend from its opposite ends and which are journaled in side walls 28 and 30. Anvil 166 includes a pair of lugs 178, which are positioned at its opposite ends, and a cutting edge 180 that is adapted to coact with cutting edge 174. Anvil 166 is urged into engagement with cutting edge 180 by such means as a pair of springs 182, one end of each spring abutting against anvil 166 and the other end of each spring projecting into a sleeve 184 pivotally mounted, as at 186, on one of side walls 28 and 30. A suitable rod 188 which projects through spring 182 prevents it from buckling.

In accordance with the present invention, there is provided a processing chamber 190 (Fig. 2) into which a sandwich, formed by rollers 126 and 128, may advance and within which a succession of sandwiches so formed may be stacked for substantially a predetermined processing period. Processing chamber 190 is bounded, in the illustrated embodiment, by side walls 28 and 30, by closure 62, by a light shield 192 suitably affixed to vertical tie plate 34, and by a platform 194 suitably affixed at its opposite edges to side walls 28 and 30 and at one of its ends to crosspiece 36. Platform 194 is adapted to support a plurality of sandwiches in stacked relation. It is to be noted that platform 194 lies in a plane intersecting the plane defined by guide surface 24, this construction making for compactness by enabling spool 72 to be positioned adjacent to one of the platform's opposite ends on one of its opposite sides and by enabling spool 114 to be positioned adjacent to the other of the platform's opposite ends on the other of its opposite sides.

Figure 3:
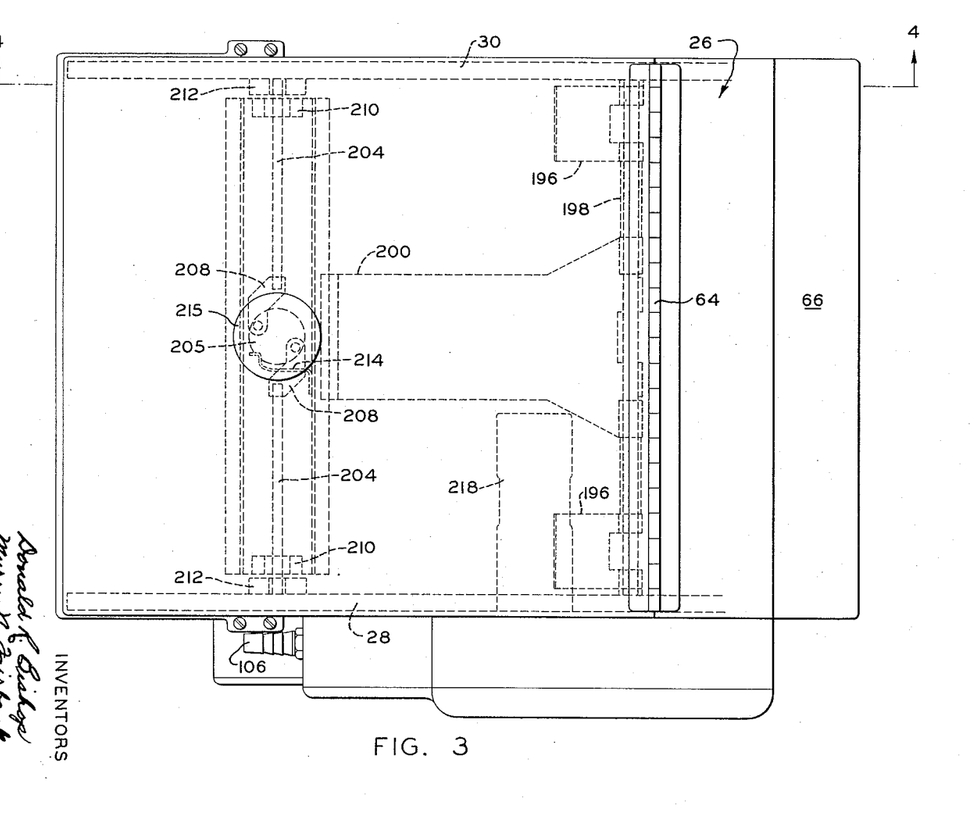
Fig. 3 is a top plan view taken substantially along the line 3—3 of Fig. 1.

A means is provided for stacking a succession of sandwiches on platform 194. This means (Figs. 1, 2 and 3), in the form thereof as shown, comprises a pair of guides 196 pivotally mounted adjacent side walls 28 and 30 on an axle 198, the ends of which are secured to the side walls. The central portion of each guide lies substantially in a surface, the slope of which is no greater than ninety degrees with respect to that end of platform 194 adjacent cutter 164. The free end of each guide is curved away from cutter 164 and is urged toward platform 194 by suitable helical springs (not shown) coiled around axle 198. The leading edge of a sandwich, when advancing past anvil 166, initially contacts the central portions of guides 196 and is directed toward platform 194 and thence between platform 194 and the free ends of guides 196. After the sandwich has advanced past anvil 166, rotation of roller 126 ceases and pivotal movement of cutter 164 occurs. Edge 174 of cutter 164, in addition to severing the sandwich at its trailing edge from the remainder of sheets 70 and 110, engages this trailing edge and continues to pivot throughout a predetermined arc, thereby further advancing the sandwich into processing chamber 190. Viewing Fig. 2, the lower portions of guides 196 are adapted to direct newly formed sandwiches into stacked relation and to prevent the trailing corners of stacked sandwiches from curling. A guide 200 is adapted to contact the leading portions of stacked sandwiches in order to prevent them from curling. Guide 200 is pivotally mounted on axle 198 between guides 196 so that it may be pivoted away from platform 194 in order that the sandwiches may be readily removed from processing chamber 190. Guide 200 is provided with a flange 202 which is adapted to abut against a portion of vertical tie plate 34 in order to limit pivotal movement of the guide toward platform 194.

Closure 62 (Figs. 1 and 3) is provided to enable an operator to remove one or more stacked sandwiches from processing chamber 190. Suitable means are provided for latching closure 62 in closed position, this means in the form shown comprising a pair of rods 204. A disk 205, pivotally mounted on closure 62, as by means of a shaft 206, is pivotally connected to the inner ends of rods 204, as by means of arms 208. A pair of bushings 210, which are affixed to closure 62, provide openings that receive outer portions of rods 204, these openings being of greater diameter than are rods 204 in order to permit them both to slide and to pivot. A pair of bosses 212, affixed to side walls 28 and 30, are provided for receiving the free extremities of rods 204 when closure 62 is in closed position. Viewing Fig. 3, rotation of disk 205 into its extreme counterclockwise position so locates rods 204 that their free extremities clear bosses 212 and thereby permit opening and closing of closure 62. Rotation of disk 205 into its extreme clockwise position so locates rods 204 that their free extremities are adapted to simultaneously project into the openings of bosses 212 and thereby to secure closure 62 in closed position. Disk 205 is adapted to be secured in the latter position by means of a detent spring 214 secured to closure 62 and adapted to snap into a suitable notch in the disk. A knob 215 affixed to shaft 206 may be manually engaged by an operator in order to rotate disk 205.

A spring 216, affixed to vertical tie plate 34, is adapted to project into an aperture 217 in guide 200 in order to hold the guide in its extreme clockwise position when closure 62 is open during removal of sandwiches from chamber 190.

In accordance with the present invention, a drive means and a control means are provided for actuating pressure plate 88, roller 126 and cutter blade 164 in the following operating cycle. Pressure plate 88, in conjunction with guide surface 24, positions a frame of sheet 70 for exposure and thereafter releases it for advancement toward rollers 126 and 128. Rollers 126 and 128 rotate to advance the frame into superposition with an area of sheet 110 and spread a processing composition between the frame and the area to form a sandwich which advances into processing chamber 190. When the sandwich has advanced entirely into processing chamber 190, rollers 126 and 128 stop rotating and thereafter cutter 164 severs the sandwich from the remainder of sheets 70 and 110.

Various elements of the drive means are shown in detail in Figs. 7 through 13. In the following description of the drive means, the directions of rotation of these elements are characterized as those which would be observed when the drive means is viewed as in Fig. 7. The drive means, as shown, comprises as a prime mover a reversible direct current motor 218 (Figs. 3 and 12) of conventional design. Motor 218 is mounted on side wall 28 within chamber 190 and is provided with a drive shaft which extends through side wall 28 and which has affixed to it a drive pinion 220.

Figure 11:
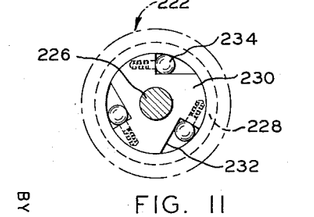
Fig. 11 is a detail view of an element of the aforementioned mechanism.
Figure 12:
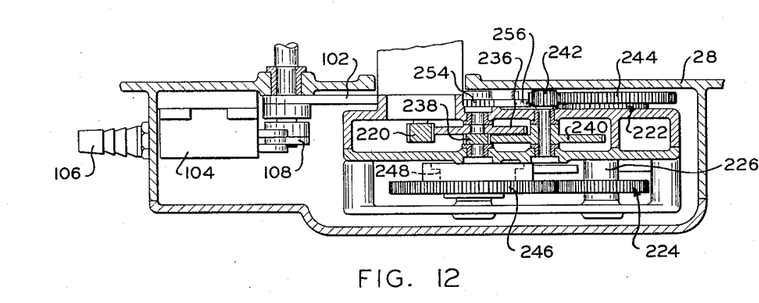
Fig. 12 is a sectional view taken substantially along the line 12—12 of Fig. 5.

Means responsive to the direction of rotation of drive pinion 220 are provided for selectively interconnecting the drive pinion either with cutter blade 164 or with roller 126. This means, in the form shown, comprises a pair of similar overrunning clutches 222 and 224 (Figs. 9 and 12) mounted in reversed relation on a common shaft 226. Fig. 11 shows clutch 222 as including a race 228, a journal 230 having a series of cam surfaces 232, and a series of spring-pressed ball bearings 234 positioned between the cam surfaces and the race. It is apparent that counterclockwise rotation of journal 230 will cause ball bearings 234 to become wedged between cam surfaces 232 and race 228 and thereby to lock the journal to the race. Clockwise rotation of journal 230, on the other hand, will prevent ball bearings 234 from becoming wedged between cam surfaces 232 and race 228 and thereby will permit the journal to rotate with respect to the race.

Accordingly, drive pinion 220, when rotating in a counterclockwise direction, is selectively interconnected with blade 164 and, when rotating in a clockwise direction, is selectively interconnected with roller 126. Thus, when rotating in a counterclockwise direction, pinion 220 (Figs. 7, 9 and 12) imparts no motion to the roller 126 but transmits power to cutter blade 164 through a gear 236, a pinion 238, a gear 240, a pinion 242, a gear 244, shaft 226, overrunning clutch 224, a gear 246, an eccentric 248, a link 250 and a crank arm 176. When rotating in a clockwise direction, pinion 220 (Figs. 7 and 9) imparts no motion to cutter blade 164, but transmits power to roller 126 through gear 236, pinion 238, gear 240, pinion 242, gear 244, shaft 226, overrunning clutch 222, a gear 252 and gear 138. Rotatable with gear 246 (Figs. 8, 10 and 12) is a ratchet 254 which coacts with a pawl 256 to prevent counterclockwise rotation of gear 246 which may result from residual friction in clutch 222. Ratchet 254 carries a pin 258 which is adapted to bear against arm 102 in order to deactuate pressure plate 88 when gear 246 is in a predetermined phase of its rotational cycle.

Suitable heating means of conventional design, shown in the illustrated embodiment in Fig. 1 at 260, 262 and 264, may be provided for regulating the temperature of the various portions of sheets 70 and 110.

Figure 13:
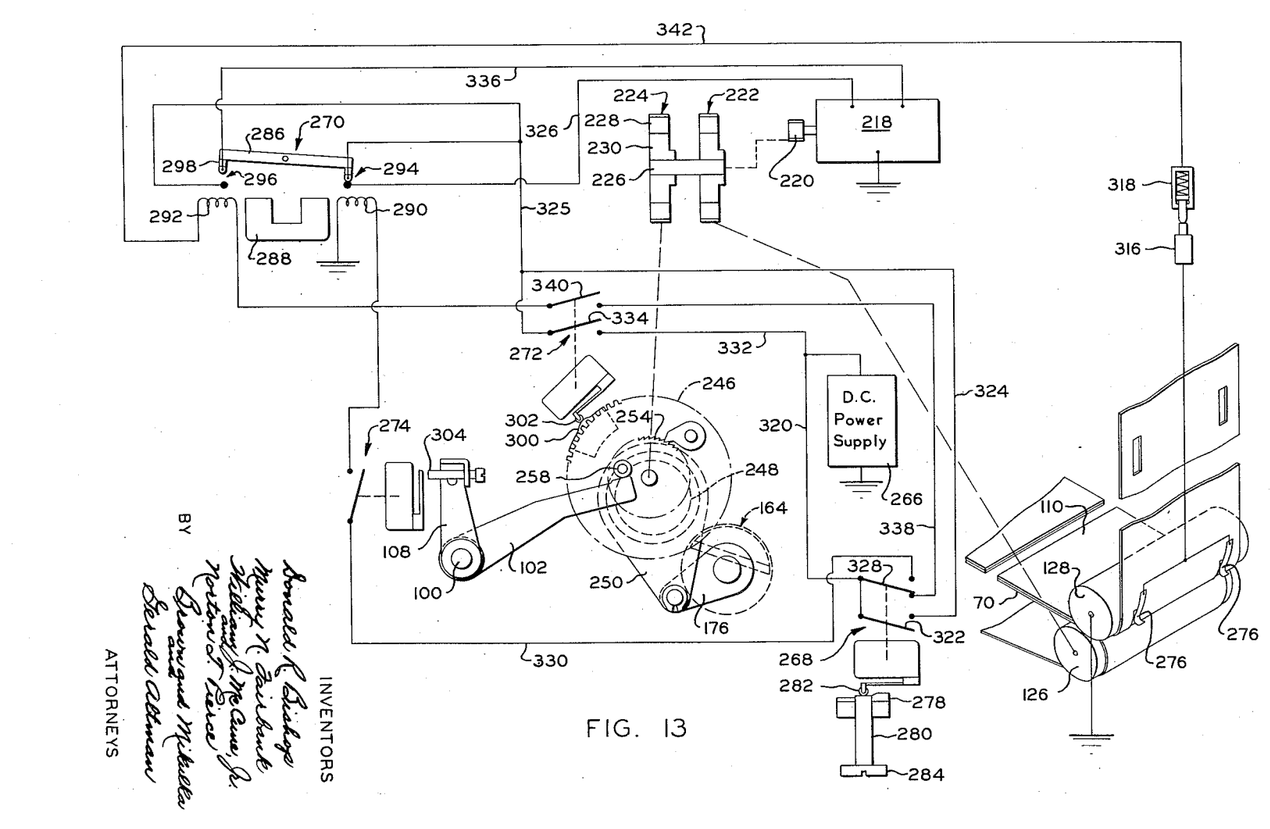
Fig. 13 is an electrical and mechanical diagram of a means for controlling the operation of the aforementioned mechanism.

The control means, as shown in Fig. 13, comprises a suitable direct current power supply 266 provided with a suitable on-off switch, a switch 268 for initiating the operating cycle, a magnetic latching relay 270 having two alternative positions for determining the direction of rotation of motor 218, a pair of switches 272 and 274 for selecting one or the other of the two alternative positions of switch 270 at successive substantially predetermined instants, and a pair of brushes 276, 276 for terminating the operating cycle.

For operating switch 268 (Figs. 7, 10 and 13) there are provided a cam disk 278 carried by one end of a rotatable shaft 280 and a cam follower 282 operatively connected to switch 268. A coupling means 284, carried at the other end of shaft 280, is adapted to be operatively connected to the shutter mechanism of the camera with which housing 26 is associated in such a manner as to rotate disk 278 throughout one revolution when the shutter mechanism has been opened for a single exposure. As viewed in Fig. 13, follower 282 is in an upper position and switch 268 is actuated during a predetermined portion of the rotational cycle of disk 278.

Magnetic latching relay 270 is of the type which includes a pivotable armature 286 of high magnetic permeability, a permanent magnet 288, the poles of which are adjacent opposite ends of the armature, and a pair of coils 290 and 292 also adjacent opposite ends of the armature. This arrangement is such that in the absence of current flow through either of coils 290 and 292, armature 286 is capable of assuming one of two stable pivotal positions by reason of the proximity of one end of the armature to one of the poles of magnet 288 and the remoteness of the other end of the armature from the other of the poles of the magnet. Each of coils 290 and 292 is adapted to produce a flux capable of neutralizing the flux of the pole of magnet 288 to which it is adjacent, thereby being adapted to cause armature 286 to pivot from one stable position to the other as desired. Associated with the opposite ends of armature 286 are a pair of switches 294 and 296, one of which is closed and the other of which is open when armature 286 is in one of its stable positions. As viewed in Fig. 13, the upper terminals of switches 294 and 296 are insulated from armature 286 by a suitable nonconducting material 298. That one of switches 294 and 296 which is closed determines the direction of rotation of motor 218 in a manner to be more fully described.

For operating switch 272 there are provided a cam 300 attached to gear 246 and a cam follower 302 operatively connected to switch 272. Switch 272 is open only when follower 302 engages cam 300.

For operating switch 274 there is provided a contact screw 304 (Figs. 7 and 13) adjustably mounted on arm 108 and therefore pivotable about the axis of shaft 100 with crank arm 102 and arms 98 (Fig. 1). Screw 304, when in its extreme counterclockwise position, operates to close switch 274. Springs 92 (Fig. 1) which bias pressure plate 88 upwardly act through arms 98 (Fig. 1), shaft 100 (Figs. 1 and 13) and arm 108 to urge screw 304 in a counterclockwise direction. Pin 258, as stated above, is adapted to abut against crank arm 102 and thereby to temporarily open switch 274 during a predetermined portion of the counterclockwise rotational cycle of ratchet 254. It is to be noted that switch 274 is open when pressure plate 88 is actuated and that switch 274 is closed when pressure plate 88 is deactuated.

Brushes 276 (Fig. 1) are pivotally mounted, as at 306, on a pair of brackets 308, mounted in turn on cover member 66. When cover member 66 is closed, brushes 276 are biased toward roller 128 by such means as springs 310. The edges of sheet 110 are provided with pairs of apertures through which brushes 276 are adapted to project, one pair of apertures being associated with one image-receiving area of sheet 110. Brushes 276 may be prevented from contacting roller 128 by the edges of sheet 110 but are adapted to contact the roller through pairs of apertures with which they become aligned. Roller 128 is electrically connected to ground by such means as a silver pin 312 which is spring urged through shaft 144 against a silver contact 314 suitably affixed to wall 28. Brushes 276 are operatively connected to the control circuit by means of a pair of terminals 316 and 318. Terminal 316 is mounted on cover member 66 and is electrically connected to brushes 276 by suitable leads. Terminal 318 is mounted on crosspiece 38 and is spring pressed into electrical contact with terminal 316 when cover member 66 is closed.

Figure 7:
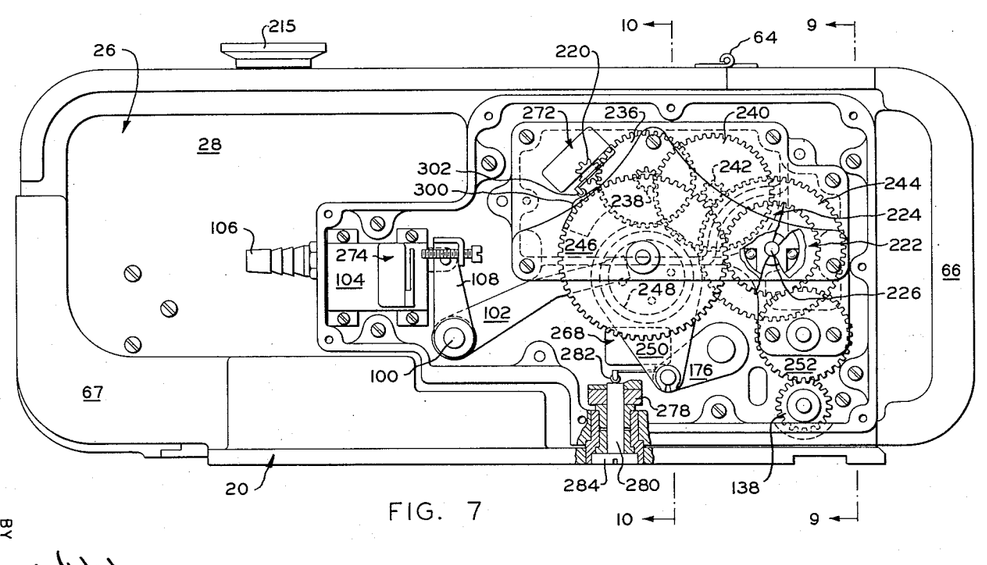
Fig. 7 is a side elevation, partly broken away, taken substantially along the line 7—7 of Fig. 5 and showing details of a mechanism embodied in the magazine of Fig. 1.
Figure 8:
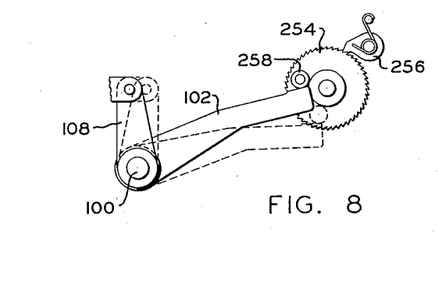
Fig. 8 is a fragmentary, sectional view taken substantially along the line 8—8 of Fig. 5 and showing additional details of the aforementioned mechanism.
Figure 9:
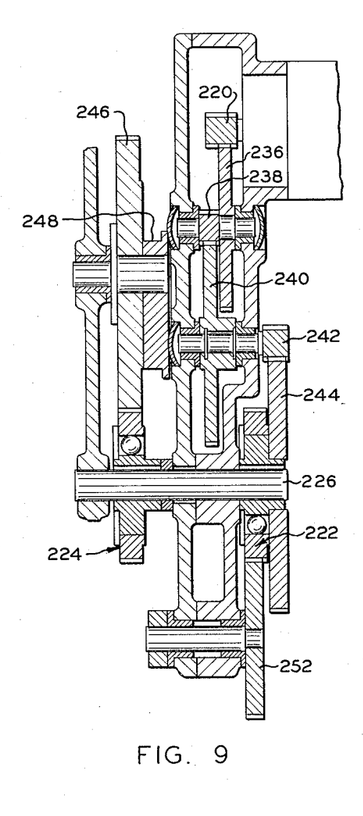
Fig. 9 is a sectional, distorted, "rolled-out" view showing the interaction of various gears of the aforementioned mechanism with their axes of rotation lying in a single plane.
Figure 10:
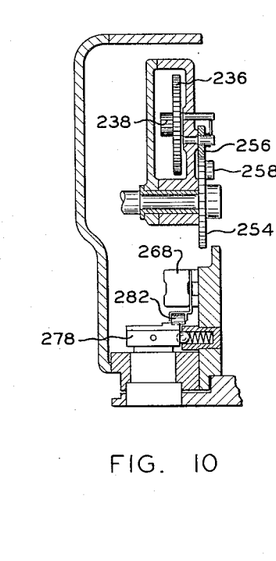
Fig. 10 is a sectional view taken substantially along the line 10—10 of Fig. 7.

Now consider Figs. 7, 8 and 13, wherein the drive and control means are shown at rest before initiation of the operating cycle. When the shutter mechanism of the associated camera is actuated, a frame of sheet 70, clamped against guide surface 24 by pressure plate 88, is exposed. Thereafter, disk 278 is driven via coupling means 284 through a single rotational cycle. At the beginning of the rotational cycle, cam follower 282 moves to its upper position, thereby actuating switch 268 so that current flows from power supply 266 through a lead 320, the blade 322 of switch 268, a lead 324, a lead 325, switch 294, a lead 326 and motor 218 to ground, as a consequence of which drive pinion 220, as viewed in Figs. 7 and 8, rotates in a clockwise direction. Drive pinion 220, now, by causing clockwise rotation of gear 246 and disengagement of cam 300 from follower 302, causes switch 272 to open. Drive pinion 220, further, by causing clockwise rotation of ratchet 254 and disengagement of pin 258 from crank arm 102 permits pressure plate 88 to move upwardly and switch 274 to close.

At this point current flows from power supply 266 through lead 320, the blade 328 of switch 268, a lead 330, the blade of switch 274 and coil 290 to ground, as a consequence of which arm 286 is pivoted in a counterclockwise direction to open switch 294 and to close switch 296. Current now flows from power supply 266, through lead 332, the blade 334 of switch 272, lead 325, switch 296, lead 336, and motor 218 to ground, as a consequence of which drive pinion 220 rotates in a clockwise direction. Clockwise rotation of drive pinion 220 causes counterclockwise rotation of roller 126 and advancement of sheets 70 and 110 in superposed relation between rollers 126 and 128.

Cam 278 and follower 282 are so constructed and arranged as to maintain switch 268 in actuated condition until sufficient advancement of sheets 70 and 110 between rollers 126 and 128 has occurred to break the electrical connection between brushes 276 and roller 128 by disaligning brushes 276 and a pair of apertures through which they project. Thereafter, when switch 268 is deactuated, current flows from power supply 266 through lead 332, blade 334 of switch 272, lead 325, switch 296, and motor 218 to ground, thereby maintaining clockwise rotation of drive pinion 220.

Clockwise rotation of drive pinion 220 and advancement of sheets 70 and 110 between rollers 126 and 128 continues until brushes 276 once more become aligned with a pair of apertures at the edges of sheet 110 and make electrical contact with roller 128. Now, current flows from power supply 266 through lead 320, blade 328 of switch 268, a lead 338, the blade 340 of switch 272, coil 292, a lead 342, terminals 318 and 316, brushes 276 and roller 128 to ground, as a consequence of which arm 286 pivots in counterclockwise direction once again to open switch 296, to close switch 294 and, thereby, to cause drive pinion 220 to rotate in a counterclockwise direction.

Eccentric 248, link 250 and crank arm 176 are constructed and arranged to actuate cutter 164 during this final portion of the operating cycle. When cam 300 once again engages follower 302, switch 272 is opened and the current flow through motor 218 is interrupted. The mechanism now is motionless and capable of a new operating cycle.

In order to place the illustrated magazine in condition to be loaded, cover member 66 is disengaged from housing 26 and, by rotating crank shaft 56, hook portions 54 are disengaged from hook-shaped elements 46 to permit housing 26 to be unseated from frame 20. A spool 72, carrying a supply of photosensitive sheet 70, is operatively positioned within housing 26 by seating the opposite ends of shaft 74 in bosses 76. A spool 114, carrying a supply of image-receiving sheet 110, is operatively positioned within housing 26 by seating the opposite ends of shaft 116 in bosses 118. As is best shown in Fig. 2, the leader portion of sheet 70 now is threaded under roller 89 and past pressure plate 88. In order to permit the leader portions of sheets 70 and 110 to be threaded in superposed and aligned relation between rollers 126 and 128, shaft 163 is rotated in order to pivot roller 128 away from roller 126. Rollers 126 and 128 are caused to exert opposed compressional forces on these leading portions by rotating shaft 163 back to its original position. Housing 26 is now returned to its seated position on frame 20 and secured to it by appropriate rotation of shaft 56. The housing is rendered lighttight by means of cover member 66.

At this point, power supply 266 is turned on and the shutter mechanism of the associated camera is tripped a few times to advance the leader portions of sheets 70 and 110 into processing chamber 190 and to clamp a frame of sheet 70 between guide surface 24 and pressure plate 88.

Now when the shutter mechanism is tripped, this frame is photoexposed by actinic light transmitted from the camera lens through exposure aperture 22. Thereafter, pressure plate 88 is deactuated and rollers 126 and 128 rotate to advance the exposed frame into superposed relation with an image-receiving area of sheet 110. Here, a container 112 is ruptured and its contents are spread between the frame and the area to form a sandwich which advances into processing chamber 190. When the sandwich has advanced entirely into processing chamber 190, rollers 126 and 128 stop rotating and cutter 164 severs the sandwich from the remainder of sheets 70 and 110.

By means of guides 196 and 200, a plurality of such sandwiches can be stacked upon platform 194 for a substantially predetermined processing period during which in each sandwich the latent image in the frame is processed and a positive print is formed in the image-receiving area. At the end of this processing period, closure 62 may be opened to permit removal of these sandwiches from chamber 190. The image-receiving area of each sandwich may now be stripped from its associated frame for observation.

It is to be understood that apparatus of the herein disclosed type is suitable for use in conjunction with many photographic devices other than cameras, for example, devices associated with X-radiation, infrared radiation and ultraviolet radiation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus of the type wherein a photosensitive sheet is exposed and thereafter processed, said apparatus comprising a first roller and a second roller rotatable about parallel axes and resiliently urged toward each other, said first roller having end portions and an intermediate portion between said end portions, said intermediate portion having a polished cylindrical surface, said second roller having a polished cylindrical surface adapted to coact with the first-mentioned polished cylindrical surface, a first friction-generating means encircling one of said end portions and a second friction-generating means encircling the other of said end portions, rotation of said first roller being adapted to advance said photosensitive sheet and another sheet between said polished cylindrical surfaces in superposed relation, advancement of said photosensitive sheet and said other sheet in superposed relation causing registration of successive frames of said photosensitive sheet with successive areas of said other sheet and spreading of processing composition between said frames and said areas thereby forming successive sandwiches, a cutting means for successively severing said sandwiches from the remaining portions of said photosensitive sheet and said other sheet, drive means adapted to be operatively connected either to said first roller or to said cutting means, and control means for selectively operatively connecting said drive means to said first roller and to said cutting means, said control means including at least a brush positioned adjacent an end of said second roller and arranged to make electrical contact with said second roller when aligned with a perforation in the edge of one of said sheets.

2. Photographic apparatus of the type wherein a photosensitive sheet is exposed and thereafter processed, said apparatus comprising a means providing a guide surface lying substantially in the focal surface of a lens, a pressure plate, when actuated, for clamping portions of said photosensitive sheet to said guide surface in order to successively position frames of said photosensitive sheet for exposure and, when deactuated, for permitting movement of said portions of said photosensitive sheet relative to said guide surface, a pair of pressure-applying rollers, at least one of said rollers having end portions and a metallic intermediate portion between said end portions, said intermediate portion providing a polished cylindrical surface, the other of said rollers having a metallic intermediate portion providing a polished cylindrical surface adapted to coact with said first-mentioned polished cylindrical surface, a first friction-generating means encircling one of said end portions, and a second friction-generating means encircling the other of said end portions, cutting means, when actuated, for successively severing said sandwiches from the remainder of said photosensitive and other sheets, rotation of said pressure-applying rollers causing spreading of processing composition between successive frames of said photosensitive sheet and successive areas of another sheet to form successive sandwiches, drive means for selectively operatively deactuating said pressure plate, rotating one of said rollers and actuating said cutting means, control means for selectively operatively connecting said drive means either to said pressure plate and said one of said rollers or to said cutting means, a generally flat platform one edge of which is adjacent said rollers, and positive means for stacking a plurality of said sandwiches on said platform.

3. Photographic apparatus of the type wherein a photosensitive sheet is exposed and thereafter processed, said apparatus comprising a housing, means associated with said housing and providing a guide surface for successively positioning frames of said photosensitive sheet for exposure in the focal plane of a lens, a pair of pressure-applying rollers for spreading processing composition between successive frames of said photosensitive sheet and successive areas of another sheet to form successive sandwiches, said rollers being rotatably mounted on said housing, an elongated cutter blade for successively severing said sandwiches from the remaining portions of said photosensitive sheet and said other sheet, the opposite ends of said elongated rotary cutter blade being rotatably mounted on portions of said housing, a generally flat platform for receiving said sandwiches, drive means for selectively operatively rotating one pressure-applying roller of said pair and said cutter blade, control means for selectively operatively connecting said drive means to said one pressure-applying roller of said pair and to said cutter blade, and positive means for stacking a plurality of said sandwiches on said platform, the axes of said rotation of said cutter blade and said rollers being substantially parallel, said control means including at least a brush positioned adjacent an end of and arranged to make electrical contact with an end of one pressure-applying roller of said pair when aligned with a perforation in the edge of one of said sheets.

4. Photographic apparatus comprising a housing, means associated with said housing and providing a guide surface lying substantially in a plane, a pressure plate mounted in said housing for movement toward and away from said guide surface, a pair of rollers rotatably mounted at their ends on said housing, one of said rollers having end portions and an elongated, smooth, substantially cylindrical surface between said end portions, friction-generating means encircling said end portions, the other of said rollers having an elongated, smooth, substantially cylindrical surface adapted to exert pressure on the first-mentioned cylindrical surface, a cutter having an elongated cutting edge, said cutter being rotatably mounted at its ends on said housing, the axis of rotation of said cutter and the axes of rotation of said rollers being substantially parallel, the length of said cutting edge being of the same order of magnitude as the length of each of said cylindrical surfaces, a drive means, first connecting means responsive to said drive means to cause movement of said pressure plate toward said guide surface, second connecting means responsive to said drive means to cause rotation of said rollers, third connecting means responsive to said drive means to cause rotation of said cutter through a predetermined cutting arc, and control means for rendering said first, second and third connecting means operative in sequence during a predetermined cycle, said drive means including a reversible motor, said second connecting means including a first overrunning clutch and said third connecting means including a second overrunning clutch, said first and second overrunning clutches being mounted in reversed relation on a common shaft, said motor being operatively connected to said shaft whereby rotation of said motor in one direction renders said second connecting means operative and rotation of said motor in the opposite direction renders said third connecting means operative.

5. The apparatus of claim 4 wherein said control means includes switch means for initiating rotation of said motor in said one direction, switch means for reversing the direction of rotation of said motor in order to render said second connecting means operative, switch means for again reversing the direction of rotation of said motor in order to render said third connecting means operative, and switch means for terminating rotation of said motor.

6. Photographic apparatus of the type wherein a photosensitive sheet is exposed and thereafter processed, said apparatus comprising means providing a guide surface for successively positioning frames of said photosensitive sheet for photoexposure, a pair of rotatable pressure-applying rollers for spreading a processing composition between successive frames of a photosensitive sheet and successive areas of another sheet to form successive sandwiches, a rotatable cutter having an elongated cutting edge for successively severing said sandwiches from the remainder of said sheets, the axis of rotation of said cutter and the axes of rotation of said rollers being substantially parallel, the length of said cutting edge and the length of each of said rollers being substantially equal, a platform providing a flat surface for receiving successive sandwiches in stacked relation, a drive means, a first gear train operatively connected to at least one of said rollers, a second gear train operatively connected to said cutter, and control means for alternately operatively connecting said drive means to said first gear train and to said second gear train, said control means including at least a brush positioned adjacent to an end of one of said pressure-applying rollers and arranged to make electrical contact with said one of said pressure-applying rollers through perforations in an edge of one of said sheets.

7. Photographic apparatus of the type wherein a photosensitive sheet is exposed and thereafter processed, said apparatus comprising means providing a guide surface for successively positioning frames of said photosensitive sheet for photoexposure, a pair of rotatable pressure-applying rollers for spreading a processing composition between successive frames of a photosensitive sheet and successive areas of another sheet to form successive sandwiches, a rotatable cutter having an elongated cutting edge for successively severing said sandwiches from the remainder of said sheets, the axis of rotation of said cutter and the axes of rotation of said rollers being substantially parallel, the length of said cutting edge and the length of each of said rollers being substantially equal, a platform providing a flat surface for receiving successive sandwiches in stacked relation, a drive means, a first gear train operatively connected to at least one of said rollers, a second gear train operatively connected to said cutter, and control means for alternately operatively connecting said drive means to said first gear train and to said second gear train, said drive means including a reversible motor, said control means including a first overrunning clutch for connecting said motor to said first gear train and a second overrunning clutch for connecting said motor to said second gear train, said first overrunning clutch and said second overrunning clutch being mounted in registered relation on a common shaft, said motor being operatively connected to said shaft whereby rotation of said motor in one direction operatively connects said motor to said first gear train and rotation of said motor in the opposite direction operatively connects said motor to said second gear train.

8. The photographic apparatus of claim 7 wherein said control means includes switch means for initiating rotation of said motor in one direction, switch means for reversing the direction of rotation of said motor, switch means for again reversing the direction of rotation of said motor, and switch means for terminating rotation of said motor.

9. Photographic apparatus of the type wherein a photosensitive sheet is exposed and thereafter processed, said apparatus comprising a means providing a guide surface lying substantially in the focal surface of a lens, a pressure plate, when actuated, for clamping portions of said photosensitive sheet to said guide surface in order to successively position frames of said photosensitive sheet for exposure and, when deactuated, for permitting movement of said portions of said photosensitive sheet relative to said guide surface, a pair of pressure-applying rollers, rotation of said pressure-applying rollers causing spreading of processing composition between successive frames of said photosensitive sheet and successive areas of another sheet to form successive sandwiches, cutting means, when actuated, for successively severing said sandwiches from the remainder of said photosensitive and other sheets, drive means for selectively operatively deactuating said pressure plate, rotating one of said rollers and actuating said cutting means, control means for selectively connecting said drive means either to said pressure plate and said one of said rollers and to said cutting means, a generally flat platform, one each of which is adjacent said rollers, and positive means for stacking a plurality of said sandwiches on said platform.

10. The photographic apparatus of claim 9 wherein said platform and said guide surface lie substantially in intersecting planes.

11. The photographic apparatus of claim 9 wherein the axes of rotation of said rollers and said guide surface lie substantially in intersecting planes.

12. The photographic apparatus of claim 9 wherein the plane of said platform and the plane of said axes of rotation of said rollers intersect the plane of said guide surface at different angles.

13. The photographic apparatus of claim 9 wherein positive means are provided for stacking said sandwiches on said platform.

14. Photographic apparatus of the type wherein sections of an elongated photosensitive sheet are successively exposed and processed, said apparatus comprising means providing a guide surface for successively positioning sections of said photosensitive sheet for photoexposure, a pair of rotatable elongated pressure-applying rollers for successively superposing sections of said photosensitive sheet and sections of another elongated sheet and for spreading a processing composition between sections of said photosensitive sheet and sections of said other sheet so superposed to form sandwiches, an elongated cutter blade for successively severing said sandwiches from the remainder of said sheets, the directions of elongation and the lengths of said rollers and said cutter blade being similar, a stacking platform providing a surface for successively receiving said sandwiches, said rollers being closely adjacent to an edge of said surface, said cutter blade being operative between said rollers and said edge, a stacking element for maintaining said sandwiches in stacked relation during movement of said apparatus, a prime mover, a first power-transmitting mechanism operatively connected to at least one of said rollers, a second power-transmitting mechanism operatively connected to said cutter blade, and electromechanical control means for alternately operatively connecting said prime mover to said first power-transmitting mechanism and to said second power-transmitting mechanism.

15. The photographic apparatus of claim 14 wherein said stacking element is a pivoted arm spring pressed toward said platform.

References Cited in the file of this patent

UNITED STATES PATENTS

| | | |
|---|---|---|
| 1,171,495 | Beidler | Feb. 15, 1916 |
| 1,800,007 | Caps | Apr. 7, 1931 |
| 2,380,034 | Doyle | July 10, 1945 |
| 2,410,327 | Berry | Oct. 29, 1946 |
| 2,435,717 | Land | Feb. 10, 1948 |
| 2,443,154 | Wolff | June 8, 1948 |
| 2,516,398 | Land | July 25, 1950 |
| 2,520,799 | Debrie | Aug. 29, 1950 |